United States Patent [19]

Ruck et al.

[11] Patent Number: 4,557,565

[45] Date of Patent: Dec. 10, 1985

[54] BEAM SUNLIGHTING DEVICE FOR BUILDING INTERIORS

[75] Inventors: Nancy C. Ruck; David R. Mills; Erik Harting, all of Sydney, Australia

[73] Assignee: Unisearch Limited, Kensington, Australia

[21] Appl. No.: 596,272

[22] Filed: Apr. 3, 1984

Related U.S. Application Data

[63] Continuation-in-part of Ser. No. 423,306, Sep. 24, 1982, abandoned.

[51] Int. Cl.$^4$ .................. G02B 17/00; G02B 27/00
[52] U.S. Cl. ........................................ 350/262; 350/265
[58] Field of Search .................. 350/258–265

[56] References Cited

U.S. PATENT DOCUMENTS

| | | | |
|---|---|---|---|
| 586,220 | 7/1897 | Basquin | 350/262 |
| 607,792 | 7/1898 | Winger | 350/262 |
| 693,088 | 2/1902 | Wadsworth | 350/262 X |
| 717,783 | 1/1903 | Wadsworth | 350/262 |
| 720,987 | 2/1903 | Wadsworth | 350/262 |
| 721,256 | 2/1903 | Wadsworth | 350/262 |
| 721,259 | 2/1903 | Wadsworth | 350/262 |
| 732,474 | 1/1903 | Wadsworth | 350/262 |
| 749,761 | 1/1904 | Wadsworth | 350/262 |

*Primary Examiner*—Richard A. Wintercorn
*Attorney, Agent, or Firm*—Cushman, Darby & Cushman

[57] ABSTRACT

A method and means of transmitting sunlight into the interior of a building by use of a planar solid transparent light deflecting panel or plate which is formed of a plurality of parallel identically spaced apart triangular ribs on one face, with the panel in its vertical orientation, the top slope angle ($\gamma$) of each triangular rib, the bottom slope angle ($\beta$) of each triangular rib and the included angle ($\beta+\gamma$) being within defined limits so that the panel substantially totally internally reflects external incident direct sunlight internally of the building when the panel is placed over an opening, such as a window, of the building, the panel being, by virtue of the specified angular ranges, particularly suited for use over a wide range of latitudes and requiring a minimal number of changes in tilt due to seasonal variations to usefully accommodate solar altitude and azimuth without producing glare while providing a predictable light distribution which can be integrated with electric light.

4 Claims, 10 Drawing Figures

BEAM SUNLIGHTING DEVICE FOR BUILDING INTERIORS

This application is a Continuation-In-Part of application Ser. No. 423,306, filed Sept. 24, 1982, now abandoned.

The present invention relates to improving natural lighting within buildings and more particularly to a panel for redirecting sunlight toward the interior of a building.

Among the options of reducing lighting energy comsumption in buildings is the effective utilization of sunlight. By using direct beam radiation from the sun deeper light penetration and higher illuminance levels can be achieved in building types that have predominantly daytime use patterns. However, no energy savings will occur unless lights are turned off or dimmed.

Figure 1:
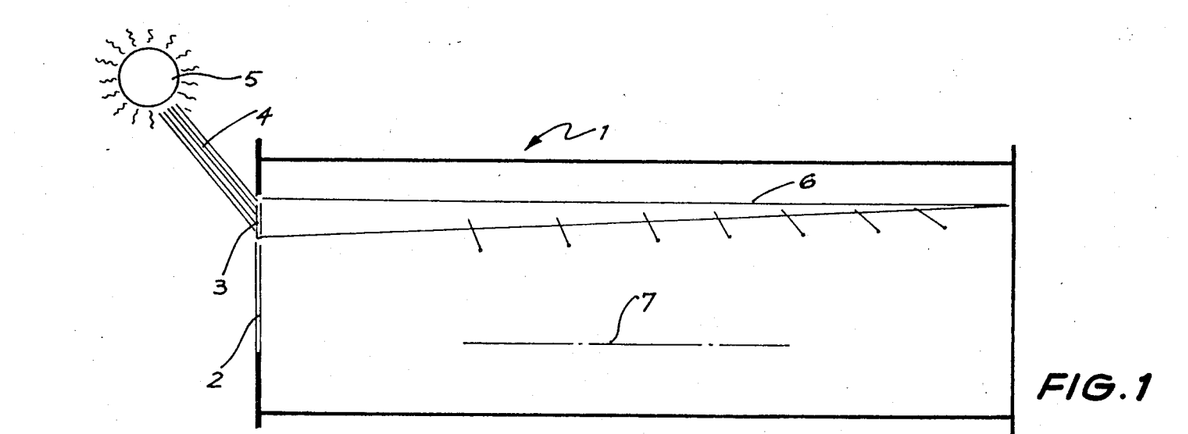
FIG. 1 is a schematic sectional view demonstrating beam sunlighting.

There are several methods to reduce electrical energy consumption in industrial and commercial buildings. Apart from the obvious step of using more efficient sources the most fruitful area for energy conservation is the exploitation of sunlight. It is generally accepted that sunlight is best excluded from work areas in buildings because of the intolerable glare it creates. However sunlight can augment skylight in buildings if it is controlled properly and in a manner to facilitate its integration with electric light on days when its intensity is low. It has been found that the duration of sunshine penetration, not its intensity or the size of the sunny areas, correlates with an occupant's appreciation of sunlight in an interior provided there is no glare created at workplane level. By controlling this sunlight, deeper light penetration and higher illuminance levels can be achieved in building types that have predominantly daytime use patterns. One concept hereinafter referred to as "beam sunlighting", as shown in FIG. 1, involves using a refracting system mounted in the top section of a window to direct refracted rays of sunlight onto the ceiling and upper rear walls of an internal space.

U.S. Pat. Nos. 717,783; 721,256 and 732,474 to wadsworth disclose devices for both reflecting and refracting light internally of a building by means of specific panels but they are deficient in that none of the disclosed panels was concerned with problems associated with glare or movement of the sun.

In U.S. Pat. No. 732,474 reference is made to adjusting the tilt of the prism-plate during the day or throughout the year but Wadsworth fails to appreciate that such changes require changes in his defined prism profile if his geometry as claimed is to be maintained. Tilt adjustment of the '474 device to account for movement of the principal incident rays also increases light glare.

The aim is to use the ceiling and/or upper section of an internal wall as a secondary light source to provide supplementary natural light on the workplane and thereby improve the quality of the working environment and effect substantial savings in electricity consumption.

The sun can provide a horizontal illuminance of 90,000 lux as compared with diffuse daylight with a range of approximately 8,000–40,000 lux at the latitude of Sydney Australia. The luminous efficacy of sunlight is between 100 and 120 lumens/watt as compared with a commercially available fluorescent lamp with an efficiency of 65 to 70 lumens/watt and an incandescent lamp with 14 to 22 lumens/watt. Therefore a relatively small reflecting or refracting area could direct enought sunlight onto the ceiling throughout much of the year to provide high illuminances in excess of 500 lux to depths of say 10 to 15 meters.

If extra clerestory windows are designed for beamed sunlighting, the heat input from the additional glazing must be compared with the heat from the fluorescent lamps which the solar beam lighting device of the present invention replaces. It is possible, knowing the day and time of year to evaluate both the total energy and the luminous flux which contributes to the heat load and the illuminance level inside a room. If the same input of lumens were produced by fluorescent lamps these 'equivalent' fluorescent luminances would produce more heat; therefore overheating with solar beam lighting is not seen to be an important issue.

The present invention provides a plane panel adapted to be mounted on a building facade so as to redirect incident sunlight toward the interior of said building by refraction and by substantially total internal reflection, said panel comprising a transparent plate having parallel equally spaced apart triangular ribs on one surface, the slope angle $\gamma$ of one face of each triangular rib relative to a plane normal to the plane of the panel being such that $21° \leq \gamma \leq 33°$, the slope angle $\beta$ of the other face of each triangular rib relative to said normal plane being such that $6° \leq \beta \leq 15°$ and wherein the included angle $(\beta + \leq)$ is such that $36° \leq \beta + \gamma \leq 42°$, the orientation of the panel in use being such that said one face is the uppermost face of each triangular rib.

In another form the present invention provides a panel as claimed in claim 2 or 3 wherein the surface of the panel opposite the grooved surface is planar.

In use the panel of this invention is intended to be positioned above eye height as a clerestory window i.e., as a window above a sun control hood and/or another window. As the sun is a moving source of light it is not possible to provide a panel which will satisfy all seasonal changes of the sun if the panel is to remain fixed. The present invention provides a panel which needs only to be moved through a minimal number of tilt settings to accommodate those changes. The tilt settings will, of course, vary as between different latitudes.

Embodiments of the present invention will now be described by way of example with reference to the accompanying drawings, in which.

Referring to FIG. 1 there is shown a room 1 of a building in section having a window 2. Above window 2 there is positioned an internally reflective prismatic panel 3. Incident radiation 4 from sun 5 is refracted by panel 3 and strikes suspended reflective ceiling member 6 which acts to reflect and diffuse the sunlight so as to improve illumination at workplane 7.

Figure 2:
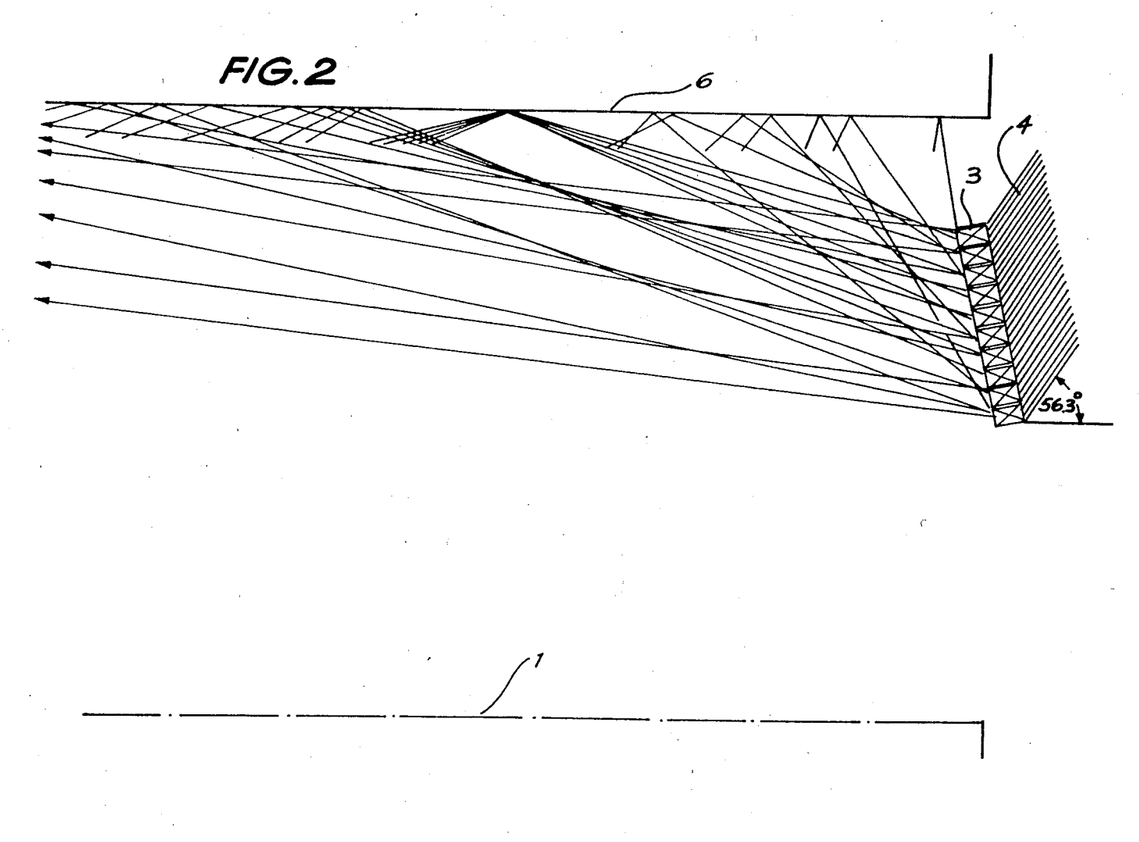
FIG. 2 is a schematic sectional view showing a first embodiment of beam sunlighting achieved by means of single prismatic panel in accordance with the present invention.
Figures 4A, 4B:
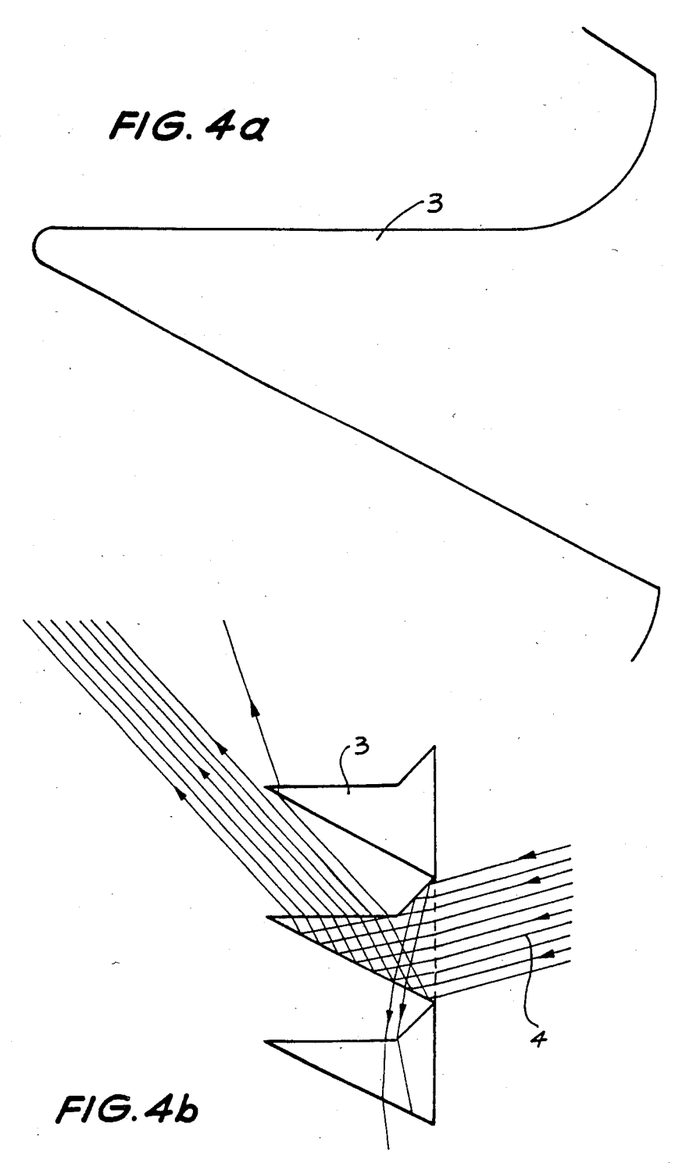
FIGS. 4a and 4b show the profile of a prismatic panel similar to that employed in the arrangement of FIG. 2.

A schematic view of a first embodiment of a prismatic panel 3 in operation is shown in FIG. 2, in which the effect of panel 3 upon incident beam radiation 4 may be seen. This embodiment of the invention uses an inwardly directed prismatic profile as shown in FIG. 4(a) which acts upon incident sunlight as shown in FIGS. 2 and 4(b). As the degree of control obtained with the profile of FIG. 4(a) is not as limited, this first embodiment is not particularly well suited to use with an automatic dimming control system connected to the co-operating artificial lighting system.

Figure 5:
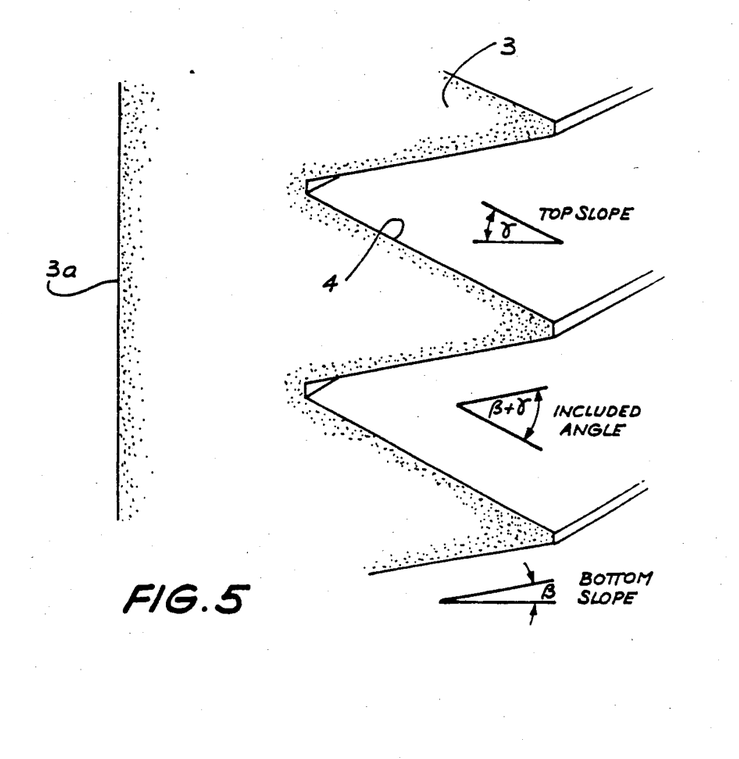
FIG. 5 is a part perspective view of a preferred embodiment of a panel in accordance with the present invention.
Figure 6:
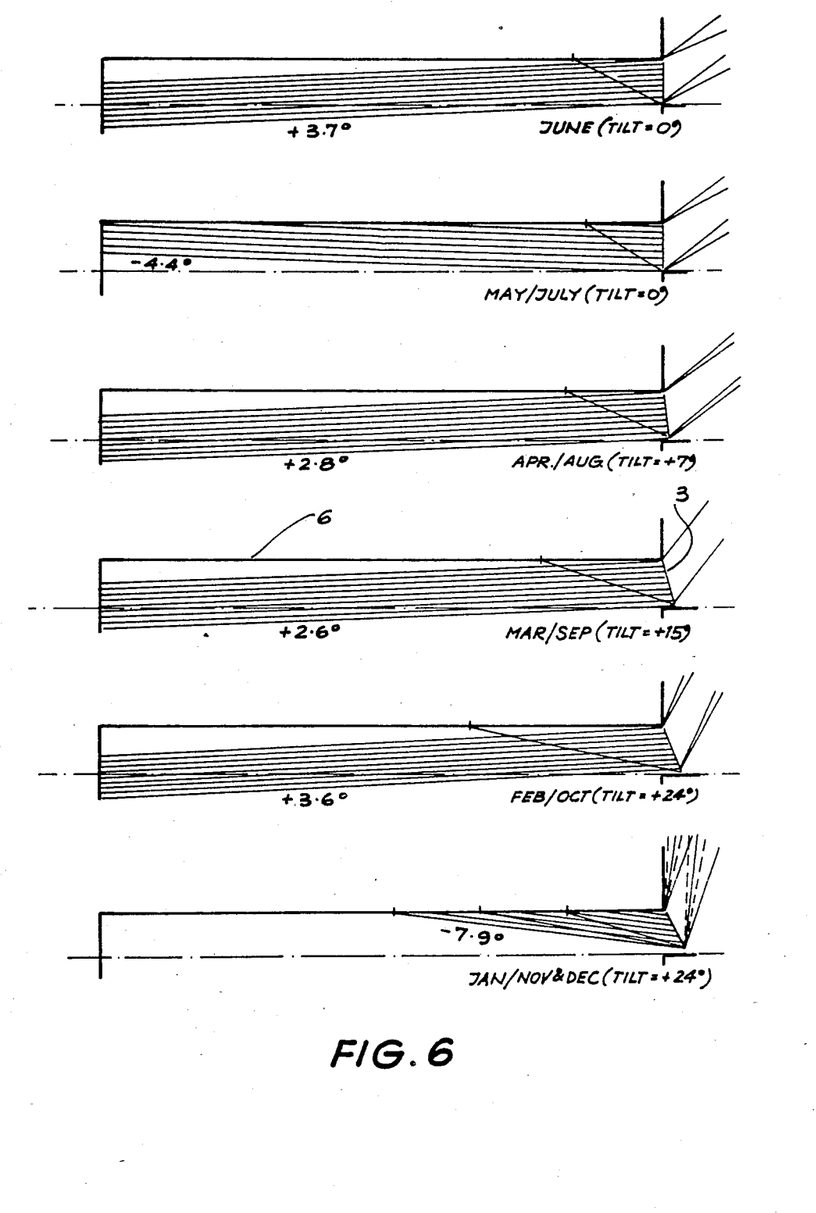
FIG. 6 shows how a tiltable panel including a profile as shown by FIG. 5 is able to direct sunlight into a building under differing seasonal conditions at different tilt angles.

A preferred inwardly directed prismatic profile is shown in FIG. 5 which acts upon incident sunlight 4 as shown in FIG. 6.

The prismatic panel of FIG. 6 is successful in eliminating glare by beaming sunlight (at all solar altitudes) either directly upwards or trapping it internally. The single panel of FIG. 5 has a transmission of the order of 92% when formed from a modified form of 'perspex' or 'plexiglass'.

Figure 3:
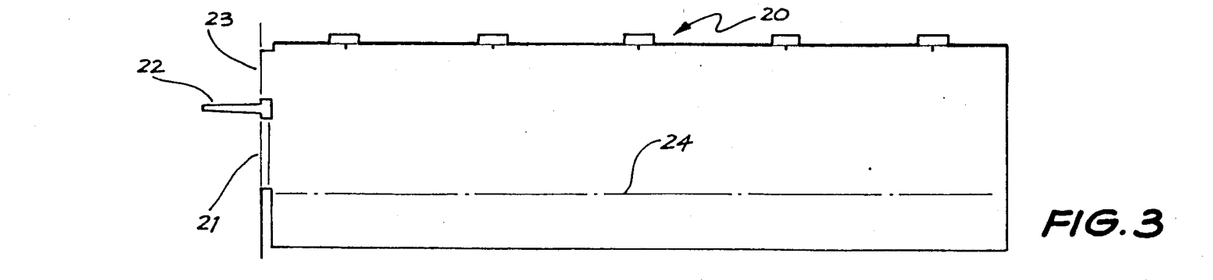
FIG. 3 is a sectional view of a model room used in computer analysis of beam sunlighting in accordance with the present invention.

An investigation of the possibilities of beam sunlighting has been undertaken by way of a computer simulation in which a room was modelled in accordance with the layout of FIG. 3, and wherein the room 20 is of considerable length with a height of 2.8 m and a depth of 10 m. Windows 21 being 1 m high and protected by an external awning or hood 22 above which is positioned a prismatic panel 23 being 0.7 m high. Assuming a typical horizontal illuminance of 8,000 lux from a clear sky the illuminance of workplane 24 has been calculated at one meter intervals based upon light from the sky alone and allowing for a transmittance of 82% the direct solar illuminance on each of the meter wide strips of ceiling from the prismatic panels. Allowing for all interreflections between the room surfaces Table 1 gives final workplane illuminances from the sky and the sun. It should be noted that the workplane illuminances computed for June 22nd are considerably higher than the illuminances for December 22nd. By altering the tilt setting, in December it is possible to achieve more equal results.

Figure 7:
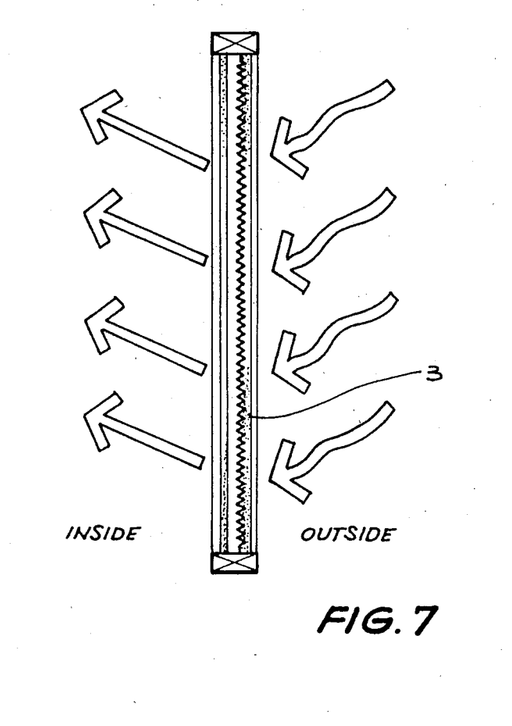
FIG. 7 is a sectional view of a double glazed prismatic panel for use in the arrangement of FIG. 8.

An apparent problem with the profile is how to keep the upper surfaces of each prism free of dust and fallout if it is to be placed on the outside of a building and the embodiment of FIG. 7 takes account of this problem.

Figure 9:
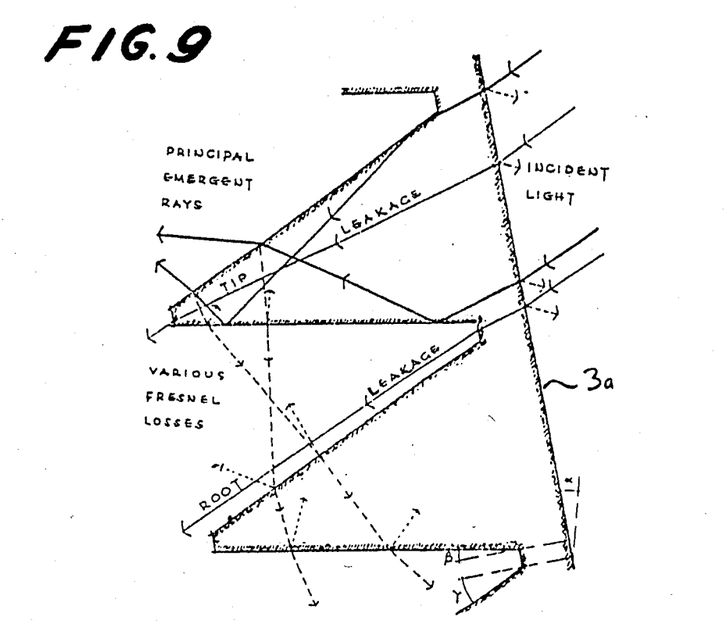
FIG. 9 is a sectional view of a panel of the form of FIG. 5 which demonstrates two different modes of internal reflection and other possible light paths through the panel.

The panel profile 3 of FIG. 5 is to be used where sunlight is incident on surface 3a as shown in FIG. 9 which schematically illustrates Fresnel reflection losses for two modes of internal reflection.

In this embodiment the included angle $(\beta+\gamma)$ is 37.5° with upper slope angle $(\gamma)$ being chosen within the range $21° \leq \gamma \leq 33°$ and bottom slope angle $(\beta)$ being chosen within the range $6° \leq \beta \leq 15°$. The prismatic panel 3 of FIGS. 5-9 is preferably made of plexiglass modified to account for the effects of heat and ultra violet radiation, and has been designed to face solar north for south hemisphere latitudes or solar south for northern hemisphere latitudes but is capable of adaptation to other orientations and latitudes by tilting (see FIGS. 6 and 8).

In addition these prism angles ($\gamma$ and $\beta$) refract the solar beams in a known distribution on the ceiling thereby facilitating the integration of sunlight and electric lighting when the sun is at a low intensity.

This embodiment provides that the prism system redirect solar beam radiation towards the ceiling at as low an angle as possible (not greater than 15 degrees above the horizontal) to obtain maximum penetration. By inference there will be a minimum of misdirected light; in particular none directed to the work-plane to produce glare. As no single value of $\beta$ will accomodate and redirect all incident solar beams during all working hours throughout the year in this manner some form of tilting is required to restrict the altitudes of the emergent beams to these limits.

Figure 8:
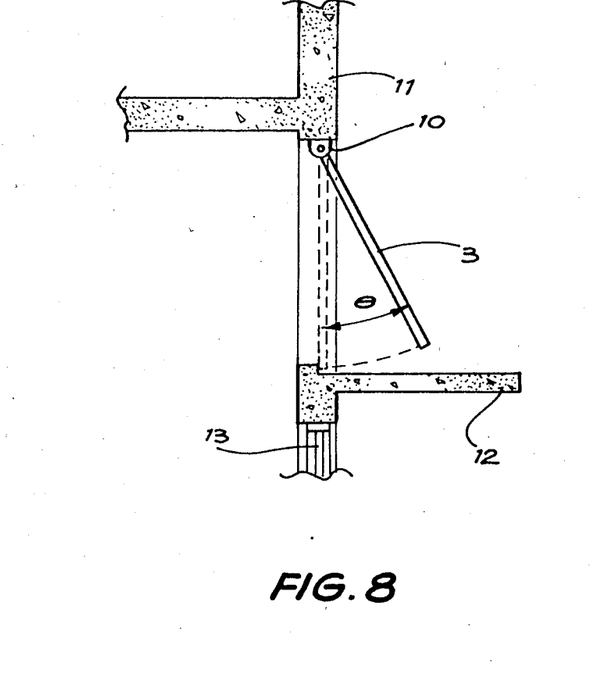
FIG. 8 is a sectional view of a tiltable double glazed tiltable panel installation.

As shown in FIG. 6 at a latitude of 34° N or S the angles of tilt are 0° (May June July) 7° (April, August) 15° (March September) and 24° (October, November, December, January, February). The depths of penetration with these four tilts are shown in FIG. 6. For example in the winter solstice in mid-June (34°S) using an angle of tilt of 0° towards the incident solar beam, the emergent beams range from 3.7° below the horizontal at 9.00 hours to a maximum of 24.1° above the horizontal at 12.00 hours solar time. In all cases there is a well defined movement from and to the rear of the room before and after solar noon. A method of installation of a tiltable panel is shown in FIG. 8 which shows a panel 3 in accordance with FIG. 7 hinged at 10 to be tilted outwardly at angle 0 relative to building 11 above sun control head 12 mounted above conventional window 13. The panel 3 in this embodiment is of a double glazed form as shown in FIG. 7.

Tilting the panel 3 at an angle $\theta$ to the vertical (see FIG. 8) has other advantages. By avoiding high or grazing angles of incidence of the solar beam, initial reflection losses are minimized and angles of incidence leading to misdirected light are excluded.

All refraction is accompanied by reflection. The panel 3 can also be inclined to the building facade to further accommodate various building orientations. Reflections off the panel face at incidence or back into the panel at emergence, constitute loss of beam output into the room in the manner shown in FIG. 9. Such reflective losses can be reduced by reducing the angle of incidence which in turn can be achieved by tilting the panel 3.

Ideally the panel should exhibit a series of sharp triangular profiles in section but due to current commercial manufacturing processes, some tip and root width is necessary. In the present design, taking into account tip and root losses (assuming tip and root radii of 0.1 mm), the overall transmission ranges from 75% to 85%.

Beyond the energy related issues, there are qualitative aspects to be considered. There is evidence to suggest that people prefer the variability introduced by natural light, to uniform lighting conditions.

In the case of solar beam lighting, test subjects observing the visual environment with a prototype prismatic panel have found the gradual movement of light across the ceiling pleasant from both psychological and physiological viewpoints.

In addition the intensity of sunlight varies. When sunlight strikes the panel from oblique angles, for example on the north facade (southern hemisphere latitudes)

toward sunrise and sunset, less light is transmitted due to wider angle of incidence. Some loss of intensity is also apparent when the depth of penetration is great. This is due to the shallow angle at which the reflected sunlight strikes the ceiling and the consequent spreading of light over a wide area.

With effective window design and intelligent use of sun controls good daylight distribution can be achieved in indoor spaces. Visibility will improve but energy savings will only occur if electric lights are turned off or dimmed. The selection of dimming versus on-off switching and controls will have a significant effect on the actual energy savings achieved in a building. Results based on research in England, indicate that substantial additional savings are realizable from dimming control systems, although more complex and costly than on-off types. In the case of beamed sunlight where there are periodic changes in illuminance level, a dimming control system would promote greater user acceptance. Several organisations in the United States have developed solid state ballasts for fluorescent lighting that have proved to be an economical alternative to the core coil ballast now in common use. These have a dimming capacity over a broad range of output levels. The Lawrence Berkeley Laboratory of the University of California initiated a development and demonstration program by retrofitting three floors of the Pacific Gas and Electric Company in San Francisco, Calif. and monitoring performance and reliability of energy efficient ballasts. Dimming and control capability were also investigated and their potential was demonstrated.

It has been established that a prismatic panel in accordance with this invention can refract rays of visible solar radiation towards the ceiling and upper rear walls in such a manner that reflected beams from these surfaces can be dispersed onto a horizontal (or vertical) work plane without producing glare or heat problems. It has also been proven that these emergent beams can be controlled by tilting the panel within practical limits, and hence the panel's profile can be adapted to most latitudes. Because the emergent beam behaves in a known manner the integration of beam sunlighting with an electric light installation is a viable proposition.

New buildings specifically designed with the application of beam sunlighting in mind can realise substantial energy and cost savings particularly in regions with abundant sunshine. North facing windows (southern hemisphere) and south facing windows (northern hemisphere) are most appropriate because the angular rate of change in solar elevation is less severe than on East and West facing facades.

It will be appreciated that the present invention is not limited by the preferred embodiments as described as variations and modifications of the invention will be apparent to the addressee within the scope of this disclosure.

We claim:

1. A plane panel adapted to be mounted on a building facade so as to redirect incident sunlight toward the interior of said building by refraction and by substantially total internal reflection, said panel comprising a transparent plate having parallel equally spaced apart triangular ribs on one surface, the slope angle $\gamma$ of one face of each triangular rib relative to a plane normal to the plane of the panel being such that $21° \leq \gamma \leq 33°$, the slope angle $\beta$ of the other face of each triangular rib relative to said normal plane being such that $6° \leq \beta \leq 15°$ and wherein the include angle $(\beta + \gamma)$ is such that $36° \leq \beta + \gamma \leq 42°$, the orientation of the panel in use being such that said one face is the uppermost face of each triangular rib and wherein the surface of the plate opposite the grooved surface is planar.

2. A panel as claimed in claim 1 when combined with a planar transparent sheet to form a double glazed panel.

3. A method of beam daylighting the interior of a building comprising positioning a panel at an external opening as a clerestory window in said building such that sunlight incident upon said panel is refracted to strike a ceiling or upper internal wall of said building and is reflected down onto a work plane, said panel comprising a transparent plate having parallel equally spaced apart triangular ribs on one surface, the slope angle $\gamma$ of one face of each triangular rib relative to a plane normal to the plane of the panel being such that $21° \leq \gamma \leq 33°$, the slope angle $\beta$ of the other face of each triangular rib relative to said normal plane being such that $6° \leq \beta \leq 15°$ and wherein the included angle $(\beta + \gamma)$ is such that $36° \leq \beta + \gamma \leq 42°$, the orientation of the panel in use being such that said one face is the uppermost face of each triangular rib.

4. A method as claimed in claim 3 wherein the panel is tiltable about a horizontal axis relative to the building so as to be adjustable to refract incident light into the building under seasonal changes in the movement of the sun at different latitudes.

* * * * *

UNITED STATES PATENT AND TRADEMARK OFFICE
CERTIFICATE OF CORRECTION

PATENT NO.   :   4,557,565
DATED        :   December 10, 1985
INVENTOR(S)  :   RUCK et al It is certified that error appears in the above-identified patent and that said Letters Patent is hereby corrected as shown below:

Title page:

Priority Data Omitted.  Should read:

--PF01125/81    Australia    Oct. 9, 1981--

Signed and Sealed this

Fifteenth Day of July 1986

[SEAL]

Attest:

*Attesting Officer*

DONALD J. QUIGG

*Commissioner of Patents and Trademarks*